March 9, 1965   R. C. MUELLER   3,172,216
TEACHING MACHINE

Filed July 10, 1961   5 Sheets-Sheet 1

*INVENTOR.*
RICHARD C. MUELLER
BY
*Knox & Knox*

*INVENTOR.*
RICHARD C. MUELLER
BY Knox & Knox

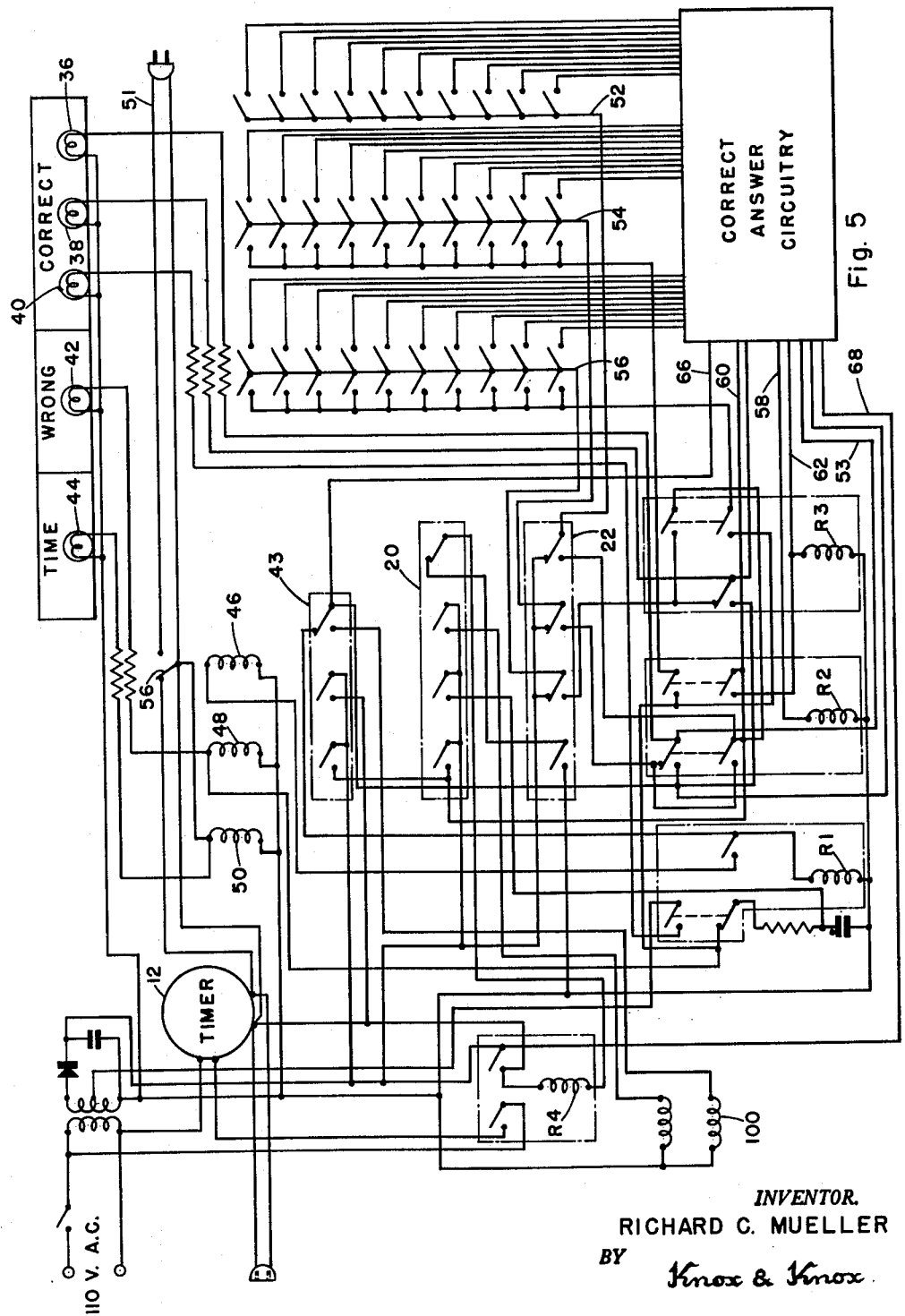

March 9, 1965 R. C. MUELLER 3,172,216
TEACHING MACHINE
Filed July 10, 1961 5 Sheets-Sheet 4

INVENTOR.
RICHARD C. MUELLER
BY
Knox & Knox

March 9, 1965 R. C. MUELLER 3,172,216
TEACHING MACHINE
Filed July 10, 1961 5 Sheets-Sheet 5

INVENTOR.
RICHARD C. MUELLER
BY Knox & Knox 3,172,216
TEACHING MACHINE
Richard C. Mueller, 1355 Muirlands Vista Way,
La Jolla, Calif.
Filed July 10, 1961, Ser. No. 122,731
1 Claim. (Cl. 35—48)

This invention relates to a teaching machine, and more particularly to a small compact teaching machine that has several modes of operation.

Background

Teaching machines are receiving ever greater acceptance, because they have many worth-while features. For example, they can relieve the load on a teacher; they permit each student to advance at his own individual rate; they make learning easy; the student is immediately informed as to the correctness of the answer, other advantages being alleged by certain authorities on the learning process.

Of the various modes in which teaching machines may operate, several are of particular interest. The first may be called the building-block mode, and this checks each step of the student's learning process. A second mode is the normal mode wherein the student's total answer is graded as being right or wrong, and he is shown the correct answer. A third mode is the testing, wherein the student does not necessarily see the correct answer. Another teaching mode is one wherein several students compete with each other. Still other modes of operation are true-false and multiple-choice tests.

Objects and drawings

It is therefore the principal object of my invention to provide an improved teaching machine.

It is another object of my invention to provide a teaching machine that can have several modes of operation.

It is a further object of my invention to provide a teaching machine that may be used in multiples.

The attainment of these objects and others will be realized from the following specification, taken in conjunction with the drawings, of which:

FIGURE 5 is an exemplary schematic wiring diagram of the circuitry;

Brief description of the invention

Figure 1:
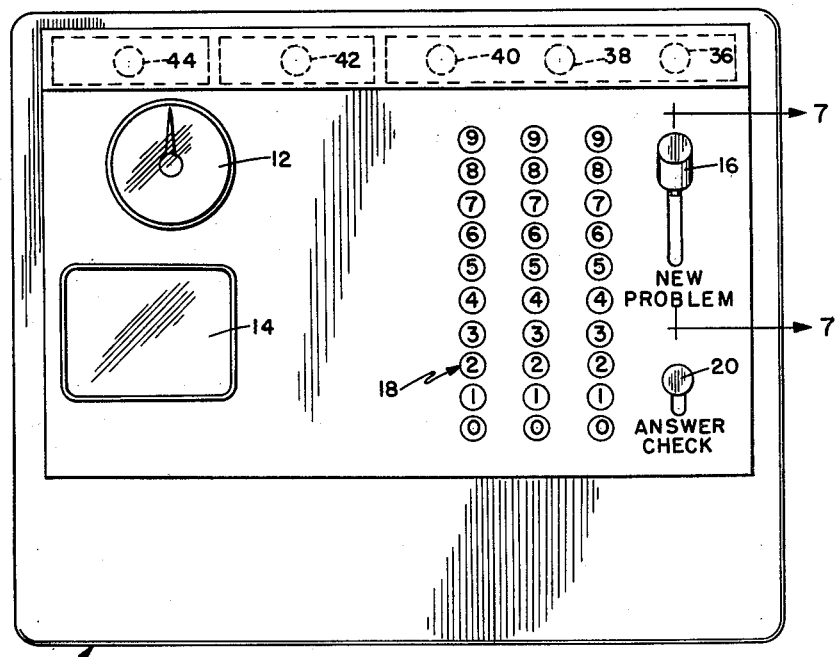
FIGURE 1 is a front elevation of my teaching machine.
Figure 2:
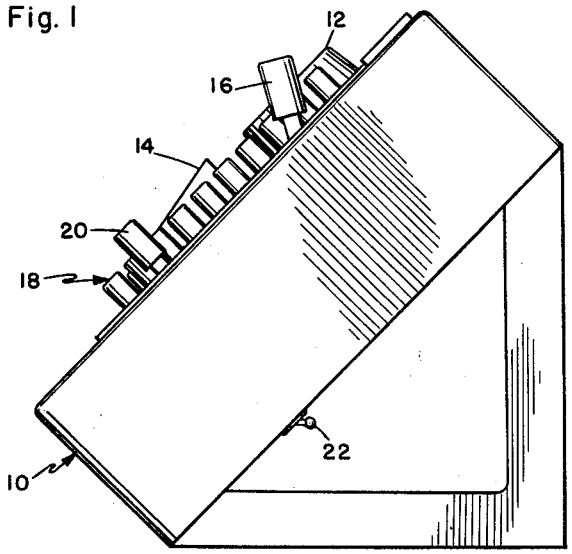
FIGURE 2 is a side elevation thereof.

My teaching machine 10 is generally shown in FIGURES 1 and 2. As may be seen, it is provided with a timer 12, and a viewing window 14 through which the student sees the question or problem and the answer, when so desired. A NEW PROBLEM lever 16 presents instructions and new problems, while a keyboard 18 permits the student to answer the problem. An ANSWER CHECK mechanism, involving the lever 20 as shown, exposes the correct answer, and causes CORRECT, WRONG, indicators, to be activated.

The program element

Figure 3:
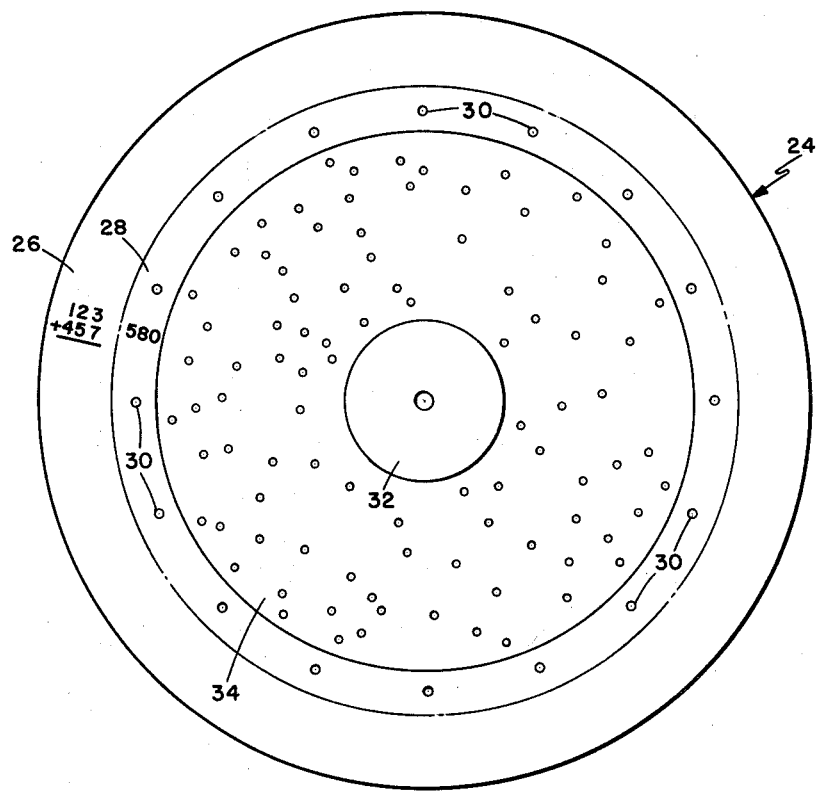
FIGURE 3 is a view of the program disc.

The questions to be answered are in the form of a "program," and the program element may take several forms. In the embodiment shown in FIGURE 3, the program is applied to a disc 24. This disc has a circumferential band 26 that contains the questions and problems that are seen through the viewing window 14. The disc 24 also has a circumferential band 28 that contains the correct answers, although these are hidden from view. Another band contains positioning or index holes 30.

If a permanent record of the student's work is desired, a record wafer 32 occupies the center of the disc.

The rest of the disc comprises an ANSWER AREA 34, which contains strategically positioned "answer" holes.

The program disc is positioned below a CORRECT ANSWER circuitry that comprises a plurality of switches. Each switch has an activating arm that rides on the program disc. At a particular position of the program disc, a particular problem is presented, and appropriate answer holes are in such positions that they permit the arms of matching switches to fall into the holes. This action causes these selected switches to close their particular circuits, and the combination of closed switches establishes a CORRECT ANSWER circuit. As will be shown later, this CORRECT ANSWER circuit coacts with the ANSWER circuit established by the depressed pushbuttons, and energizes the aforementioned indicators.

In use, the program disc fits into the teaching machine, and rotates in small steps by means of apparatus to be described later.

A given position of the disc achieves several results. The first is that a problem is positioned in the viewing window. A second result is that the answer is also positioned in the viewing window, although it is hidden until deliberately revealed. A third result is that an indexing pin locks the program disc in place. A fourth result is that the answer holes establish a CORRECT ANSWER circuit that must be matched by the ANSWER circuit established by the depressed pushbuttons of the keyboard. A fifth result is that the record wafer is positioned to receive a mark that scores the student's achievement.

Building block mode operation

As previously explained, the building block mode checks the student's step-by-step answering process. This mode of operation as shown is controlled by mode switch 22, and will be understood from the following discussion, taken in conjunction with the schematic circuits of FIGURES 5 and 6.

Figure 6:
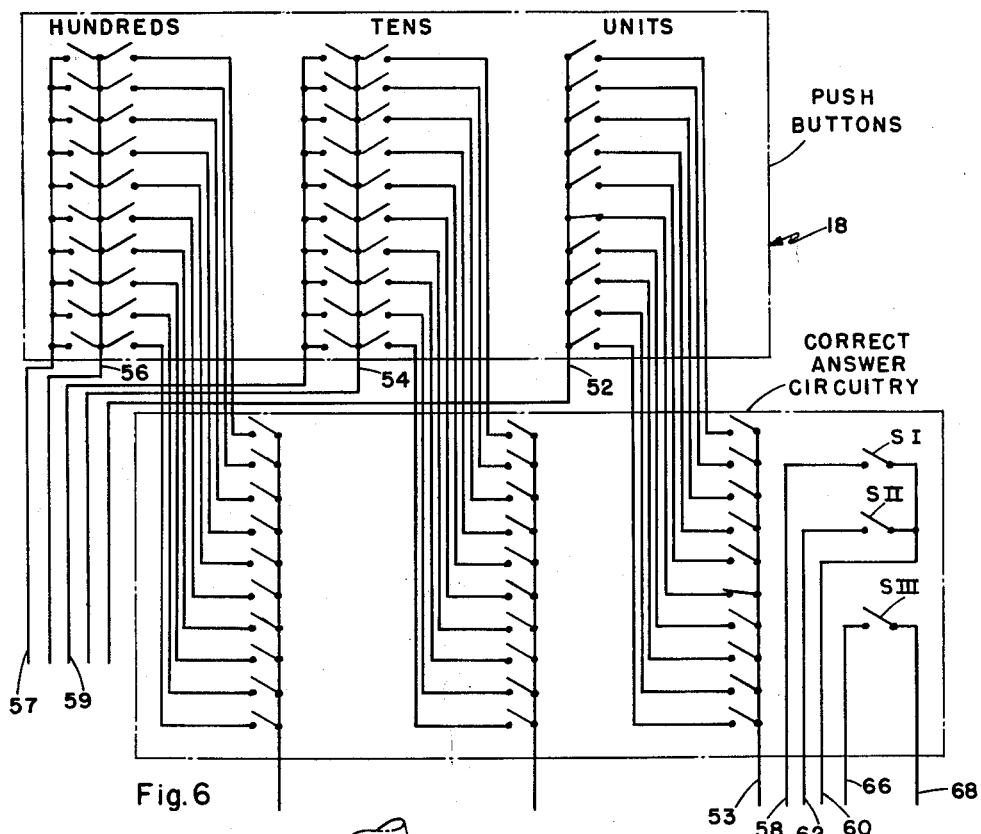
FIGURE 6 is a schematic representation of the pushbutton ANSWER circuitry and the CORRECT ANSWER circuitry.

Circuitry for the CORRECT ANSWER circuitry block in FIGURE 5 is shown in FIGURE 6. The complete circuit for each answer is closed by pressing the correct pushbuttons in the units, tens, and hundreds columns and by perforations in the program disc beneath appropriate CORRECT ANSWER circuitry switches. MODE switch 22 is operated in one of two positions. In the position shown in FIGURE 5, MODE switch 22 is in the BUILD- ING BLOCK MODE. In this mode, the common power lines of the units, tens, and hundreds pushbuttons are connected in parallel to the D.C. supply, and the starting circuit for timer 12 is disabled. This arrangement enables CORRECT lights 36–40 individually and permits step-by-step partial answer checking. When thrown to the other position for all other modes, MODE switch 22 connects said common power lines in series through the correct pushbuttons and the CORRECT ANSWER circuitry, and enables the starting circuit for timer 12. This arrangement permits use of the timer as preset to a specific problem time by the student and provides only complete answer checking. All other circuitry shown in FIGURES 5 and 6 operates in the same manner in all modes.

Figure 4:
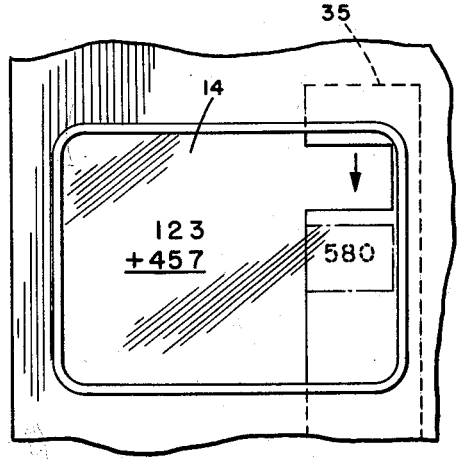
FIGURE 4 is an enlarged fragmentary view of the problem and answer viewer.

A program disc is inserted into the machine, and the student sees the initial instructions in the viewing window 14. He studies these, and then moves the NEW PROBLEM lever 16. The movement thereof advances the program disc 24 one frame, and the student sees the problem (add 123 and 457), as shown in FIGURE 4. The answer, 580, is hidden from the student by means of a shutter 35. Alternatively, the answer may be in an un-illuminated area, or may be printed in an ink that remains invisible until illuminated by suitable radiation.

The student mentally or by counting the push buttons adds the digit column of the problem, 3 plus 7, and arrives at the answer 10. He therefore depresses the zero pushbutton of the digit column of the keyboard. This action automatically cancels any number previously depressed, and causes the switch associated with that pushbutton to establish an ANSWER circuit. Since the holes in the program disc have established a CORRECT ANSWER circuit these two circuits coact to cause the digit CORRECT lamp 36 to go on. This advises the student that his answer is correct, as far as he has gone.

The student then studies the tens column of the problem (2 plus 5), and decides that the answer is 7. He enters this number into the keyboard, and since lamp 38 does not go on, the student reconsiders the problem and decides that he had forgotten to carry the 1 from the previous addition of the digit column. He decides that 2 plus 5 plus 1 equals 8, and enters this number into the tens column of the keyboard.

The CORRECT ANSWER circuit established by the answer holes of the disc now match the ANSWER circuit established by the pushbuttons, and the tens CORRECT lamp 38 is illuminated, so that the student knows immediately that the has corrected his error.

The student now studies the hundreds column of the problem. If he punches button 5, the hundreds CORRECT lamp 40 goes on. Otherwise he repeats the last mental addition, and he tries another answer.

Alternatively, in the building block mode of operation, the student may press sequential buttons until he arrives at the correct answer, and he can then figure out why this answer is correct.

Once the problem has been solved, the student moves the NEW PROBLEM lever 16. This advances the program disc, and presents a new, slightly more advanced problem for the student's consideration.

It will be seen that the building block, or tutoring mode of operation permits the student to change his mind and correct his error. It continuously checks each step of the student's progress, and guides him to the correct answer.

*Normal mode of operation*

My teaching machine may also be used in the normal mode. In this type of operation the problem is presented to the student in the same manner as previously explained, the answer being hidden by the shutter 35. The student now sizes up the problem (add 123 and 457), decides that the answer is 570, and punches this answer into the keyboard. Upon reconsideration, he feels that the answer is 580, makes the necessary correction, and moves the ANSWER CHECK lever.

This has three results. Firstly, it completes circuitry that lights up the CORRECT indicator; secondly, it scores and records that the answer was correct, and thirdly, it moves the shutter 35 so that the opening therein exposes the correct answer.

Had the answer been wrong, the WRONG lamp 42 would have been lighted. The student would then have entered the correct answer into the keyboard, and the machine would have then been in condition for the NEW PROBLEM lever to advance the disc to its next position.

In the normal mode of operation, it is desirable that the student recognize the correct answer before he advances to the next problem. My machine assures this recognition by requiring that the correct answer be in the keyboard before the disc-locking mechanism is released.

*Timing, scoring, and recording*

If desired, the student may be automatically timed. When he moves the NEW PROBLEM lever 16, timer 12 is energized through a switch 43 coupled to the lever. As soon as the ANSWER CHECK lever 20 is moved, the timer is de-energized.

Should the student take more time than the work period permits, the timer circuitry lights the OVERTIME lamp 44.

I use a timer that permits the student to set his own work period. It has been found that the learning process is more stimulated when the student is working against a deadline. The adjustable timer sets up a pre-problem time goal which the better students set to their own shorter time increment.

When the student repeats a disc for drill, the timer measures his improvement when he completes it within a shorter per problem time setting.

My teaching machine provides another timing feature, in that it records the amount of time the student requires to produce an answer.

It was previously pointed out that the timing motor was energized when the student moved the NEW PROBLEM lever, and was de-energized and reset itself when the ANSWER lever was moved. This is the time interval taken by the student to provide an answer.

Figure 9:
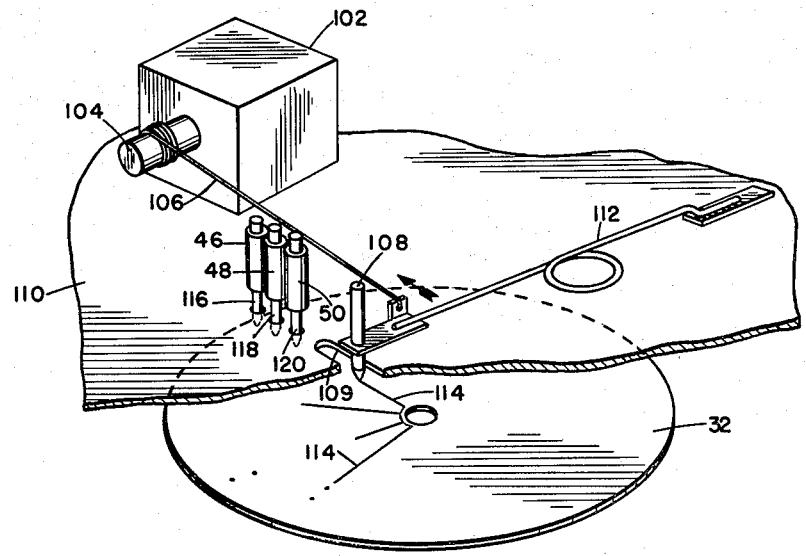
FIGURE 9 is a diagrammatic view of the timing, scoring, and recording apparatus.

FIGURE 9 shows the operation of this feature. When timing motor 102 is energized, its shaft 104 rotates, thus winding up wire 106. The shortened wire moves stylus 108, causing it to produce a radial line on record wafer 32. In order to hold the stylus pressed against the record wafer, and to restore it to its starting point, I use a compound spring 112. Other arrangements may of course be used; and if desired, a slot 109 can be provided in the back 110 of the machine to guide the tip of stylus 108.

In operation, when the timing interval is initiated, stylus 108 produces a radial time-line 114 on record wafer 32. When the ANSWER lever is moved, the timing interval ends, the motor 102 resets itself, and the stylus 108 retraces the time-line 114 back to the starting point. Since the time-line is aligned with the problem on the program disk, it readily shows the amount of time used by the student for each question.

This feature has the advantage that if a series of long time-lines appear at a particular portion of the record wafer, they indicate that the student was having difficulties with the problems positioned there. This would indicate to the teacher that more study should be devoted to that particular type of problem.

In order to have a permanent record of the student's work, a plurality (3) of solenoids 46–50 are used. Respective ones are in operative association as the indicators, and drive the styli 116–120 toward the record wafer when energized.

Thus, when the student gets a correct or wrong answer, or takes too much time, the corresponding indicator and stylus are activated; and the associated stylus produces a mark on record wafer 32. Wafer 32 is then a permanent record for both the student's and teacher's use. According to the positioning of the styli; a mark in one circumferential band shows that the correct answer was provided, whereas a mark in another band would show that the student gave the wrong answer. A mark positioned in a third band would indicate that the student had exceeded the allowed time. In all cases, the radial time-line indicates the length of time before the student provided an answer.

In this way my record wafer provides a permanent, quickly readable indicator of the student's work.

*Multiple mode of operation*

My machine may also be used for competitive responses of a group of students, each of whom operates his own machine. This result is achieved by having each correct solenoid 46 close the multiple-operation switch 56. When multiple operation is desired, all the multiple-operation switches of the various machines are connected in parallel by means of a two-wire cable 51 with the timer output wires of the various machine.

When a starting signal is given, each student moves his NEW PROBLEM lever to expose the new problem, which is the same for all students. As soon as any student gets a correct answer, his machine closes his multiple-operation switch, and flashes the OVERTIME signal on the other machines but not his own. The other students may, however, finish the problem to determine their score for accuracy, although their speed score has been obviated.

*Additional modes of operation*

My teaching machine may also be used in a true-false manner. To accomplish this, the program is set up in such a way that one particular pushbutton or column will light up the CORRECT indicator, while another particular pushbutton or column will light up the WRONG indicator.

A multiple-choice operation may also be used. In this mode, the program is set up so that a selected one or column of pushbuttons will activate the CORRECT indicator.

In this connection, it is preferred that the columns of the pushbuttons be differently colored, to facilitate the student's choice.

While the foregoing explanation has been conducted in terms of mathematics, it is evident that any question which is answerable in one, two or three numerals, letters or symbols may be handled by the machine.

*Miscellaneous circuitry*

There are times when the correct answer is in the 0–9 range, and therefore only the digit column of the keyboard should be depressed. When the correct answer falls into this range, one of the answer holes of the program activates switch SI of the CORRECT ANSWER CIRCUITRY, which, through wires 58 and 60, energizes the relays that light the CORRECT indicator when the proper digit button is depressed.

Similarly, when the correct answer is a two-digit number, an answer hole in the program disc closes switch SII, which, through wires 62 and common wire 60 energizes the relays that light the CORRECT indicator when the two correct pushbuttons are depressed.

If the student should provide a three-digit answer when only two are required, or should provide a two or three digit answer when only one is required, the false answer is directed from the pushbutton circuitry to the WRONG indicator.

FIGURE 6 is an enlarged fragmentary schematic diagram of the pushbutton ANSWER circuitry and the CORRECT ANSWER circuitry. As previously explained, the position of the answer holes of the program establishes the CORRECT ANSWER circuit, while the depressed pushbuttons establish the ANSWER circuitry.

As may be seen from FIGURE 6, the student has depressed the fifth pushbutton, and the program disc has closed the fifth switch as being the correct answer. As a result, there is a complete circuit between the digit common wire 52 and the digit correct-answer common wire 53.

The tens and hundreds circuits contain substantially the same circuitry as the digits circuit and their pushbutton circuitry contains an additional set of switches that close when the pushbuttons are depressed. Should the student make a false entry, the false-entry common wires 57 and 59 apply a signal through appropriate circuitry to the WRONG indicator.

As previously explained, switches SI and SII are included in the CORRECT ANSWER circuitry to take care of the one and two digit answers, and these switches are activated by answer holes in the program disc. Switch SIII is used to allow the program disc to be advanced when no answer is given to a problem, such as when instructions appear in the problem area, the switch being coupled by wires 66 and 68 between one side of the power supply and the new problem switch.

While my program has been shown to be an apertured disc, other embodiments may be used. For example, rather than using switches that have energizing arms, the CORRECT ANSWER circuitry may comprise wires that fit through the holes and contact a conductive plate below the program. Alternatively, the surface of the disc may have conductive areas that complete the circuits, in the manner of printed wire board.

Other forms of programs may also be used. These would include strips of paper, film, magnetic tape, etc., and the circuits could be completed by photocells, magnetic heads, or other devices.

*Disc advancing and locking mechanism*

Figure 8:
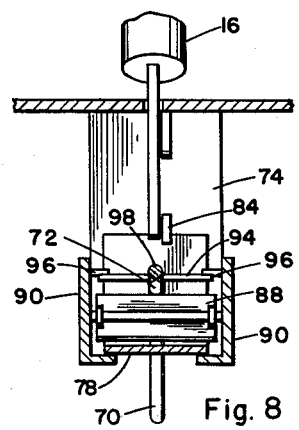
FIGURE 8 is a sectional view taken on the line 8—8 of FIGURE 7.
Figure 7:
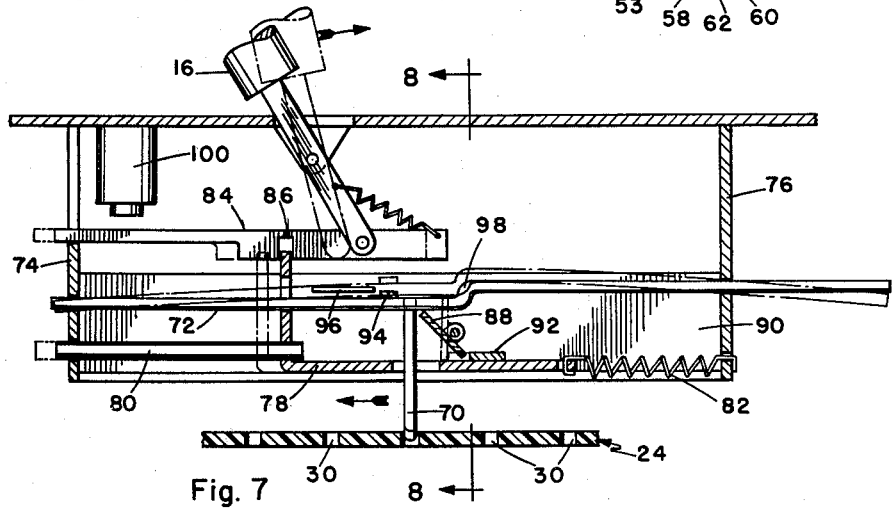
FIGURE 7 is an enlarged fragmentary sectional view taken on the line 7—7 of FIGURE 1, showing the disc advancing mechanism.

FIGURES 7 and 8 show one suitable mechanism for advancing and holding the program disc 24, but other devices may be utilized. In this particular unit an indexing pin 70, which engages one indexing hole 30 in the program disc, is carried on a slidable rod 72 between a pair of fixed end plates 74 and 76. The rod 72 passes through a shift bar 78 which is also slidable on a guide rod 80 and is biased to one end by a spring 82. The new problem lever 16 is linked to an actuating bar 84 having a notch 86 which engages the shift bar 78. Between the shift bar 78 and the rod 72 is a cam 88 pivotally mounted between fixed side plates 90 and on the shift bar is a trip block 92 which engages and pivots the cam when the bar is moved to the left, as in the drawings. This cam action raises the rod 72 and lifts the indexing pin 70 clear of the hole in the program disc, as indicated in broken line in FIGURE 7, and further motion to the left carries the indexing pin to the next hole 30. Fixed to the top of the rod 72 is a cross bar 94 which rides on guide rails 96 to hold the pin 70 clear of the program disc during its lateral travel. The rod 72 has an upwardly stepped portion 98 to clear the cam 88 after the initial lifting and sliding motion, thus when the cross bar 94 reaches the end of the rails 96, the resiliency of the rod snaps the indexing pin 70 down into the next hole 30. On the return stroke of the lever 16, the program disc 24 is advanced and the mechanism is reset.

To prevent advancing the program disc unless a correct answer has been given, a solenoid 100 is used to hold up the actuating bar 84 and prevent engagement with the shift bar 78 until released by a correct answer.

It is understood that minor variation from the form of the invention disclosed herein may be made without departure from the spirit and scope of the invention, and that the specification and drawing are to be considered as merely illustrative rather than limiting.

I claim:

In a teaching machine, timing, scoring, and recording apparatus comprising:

a record wafer capable of having marks placed thereon by styli;

first means, comprising a first stylus, for producing a mark on said wafer when the student provides a correct answer;
second means, comprising a second stylus, for producing a mark on said wafer when the student provides a wrong answer;
third means, comprising a third stylus, for producing a mark on said wafer when the student takes longer than a specified time;
fourth means, comprising a fourth stylus, for producing a line on siad wafer, the length of said line corresponding to the time taken by said student to provide an answer;
a plurality of solenoids, respective ones operatively associated with said first, second, and third means; and means for selectively causing said solenoids to extend their respective styli when suitably energized by the student's work.

References Cited in the file of this patent
UNITED STATES PATENTS

| | | |
|---|---|---|
| 2,274,811 | Sisson | Mar. 3, 1942 |
| 2,545,381 | Prentice | Mar. 13, 1951 |
| 2,564,089 | Williams et al. | Aug. 14, 1951 |
| 2,654,163 | Reyonlds | Oct. 6, 1953 |
| 2,877,568 | Bresnard et al. | Mar. 17, 1959 |
| 2,987,828 | Skinner | June 13, 1961 |
| 3,056,215 | Skinner | Oct. 2, 1962 |